United States Patent [19]

Sladowski et al.

[11] Patent Number: 4,970,678
[45] Date of Patent: Nov. 13, 1990

[54] SYSTEM FOR PROVIDING CONTEXT-SENSITIVE ON-LINE DOCUMENTATION IN A DATA PROCESSOR

[75] Inventors: Robert Sladowski, Charlotte, N.C.; David G. Wenz; David N. Youngers, both of Rochester, Minn.

[73] Assignee: International Business Machines Corporation, Armonk, N.Y.

[21] Appl. No.: 213,458

[22] Filed: Jun. 28, 1988

Related U.S. Application Data

[63] Continuation of Ser. No. 790,705, Oct. 24, 1985, abandoned.

[51] Int. Cl.⁵ .............................................. G06F 3/153
[52] U.S. Cl. .............................. 364/900; 364/943.43; 364/948.2; 364/927.61; 364/943.1; 364/518

[58] Field of Search ... 364/200 MS File, 900 MS File, 364/518, 521, 300; 400/63, 76, 83

[56] References Cited

U.S. PATENT DOCUMENTS

| | | | |
|---|---|---|---|
| 4,571,700 | 2/1986 | Emry, Jr. et al. | 364/900 |
| 4,648,062 | 3/1987 | Johnson et al. | 364/900 |
| 4,731,735 | 3/1988 | Borgendale et al. | 364/200 |
| 4,751,674 | 6/1988 | Aoyagi et al. | 364/900 |
| 4,754,326 | 6/1988 | Kram et al. | 364/900 |
| 4,800,485 | 1/1989 | Ackroff et al. | 364/200 |

Primary Examiner—Thomas C. Lee
Attorney, Agent, or Firm—J. Michael Anglin

[57] ABSTRACT

A word processor prepares a document having internal labels in the text. An application program contains a routine executable at various points for accessing the document and displaying its text at the label locations determined by the current position in the application.

5 Claims, 5 Drawing Sheets

SYSTEM FOR PROVIDING CONTEXT-SENSITIVE ON-LINE DOCUMENTATION IN A DATA PROCESSOR

This is a continuation of co-pending application Ser. No. 790,705 filed on Oct. 24, 1985, now abandoned.

BACKGROUND OF THE INVENTION

The present invention relates to electronic data processing, and specifically relates to the use of a document stored on-line in a data-processing system by an application program to provide context-sensitive aid to an operator of the application.

Continually decreasing storage costs make it attractive to store more and more of the documentation of a data-processing system on the system itself. Such information is known as "on-line documentation" and "help text".

The prior art has employed a number of methods for storing on-line information, and has even used several methods in the same application program. One or more documents can be shipped with the application as text files, along with a utility program allowing the operator to browse the text files as he would read a printed manual. The browse utility could be integrated with the application. Text records known as "help text" have been included in an application. When the operator presses a "Help" key, code in the application accesses the the text records appropriate to the particular application function currently being executed.

Each of these methods has disadvantages, and additional disadvantages appear when they are used together. On-line information is not intended to be modifiable by the user of the application program. Knowledge of the program internals is required, as well as programming skills. Help text may be so closely integrated into the application that a only the programmer, and not a technical writer, can incorporate it into the program. Neither on-line documents nor help text is easily translatable into other languages for multinational product marketing. When both forms are used in the same application, they are frequently redundant, requiring more storage space. They can be inconsistent with each other, leading to user confusion and extra effort by the application designers to eliminate. Usually, the user or operator must learn at least two different procedures: one for reading the documentation, and another for accessing the help text. On-line documentation is usually not available from inside the application; the operator must leave it, get the documentation, then leave it and restart the application, possibly losing some work in the process. Modification or translation requires the use of different editing tools for the documentation and the help text, making those tasks even more difficult when both forms of on-line information are included in the same application.

SUMMARY OF THE INVENTION

The present invention provides a simple method for creating and accessing useful and easily modifiable on-line information in a data-processing system.

The invention employs a single on-line document which performs the duties of both conventional printed manuals and context-sensitive help text. But it provides other benefits as well. It eliminates the storage which would be required for two sets of information which are largely the same. It eliminates the possibility of inconsistencies between them. Unlike conventional on-line documentation, the operator need not leave the application program to use it. It is accessed and used in the same way whether as documentation or as help text, and whether from within the application or independently as a separate task; the operator only needs to learn one procedure for any type of use. Moreover, the operator can modify it to add comments or examples, to highlight important text, to note program revisions, or for any other reason. He then has both a manual and help text which are personalizable to his own particular needs. Furthermore, making the document an entity separate from the application program allows it to be translated into different languages without disturbing any of the code of that program. Also, of course, the document can be written, edited, and translated by personnel who need not be programmers, nor have any knowledge of the internal structure of the application program, nor learn to use any specialized tools.

Broadly, the invention involves the preparation of the on-line document by a word processor or similar text-editing program having provision for placing labels or markers in the document at desired points in the text. The labels are recorded with a unique identifier and the location of its associated text in the document. An "On-Line Browse" utility in the application program is invoked when the user presses a "Help" key, and displays the document text at the document location specified in the label associated with that particular invocation point in the application program.

The user can also "bookmark" the help text. If he presses a special key when leaving the help text, the next access will return to the place he had left, rather than to the normal entry point. This function is useful in guiding a user through a long or complex operation one step at a time.

Other advantages, as well as subsidiary concepts, will become apparent to those skilled in the art from the following description of a preferred embodiment.

DRAWINGS

Figure 4:
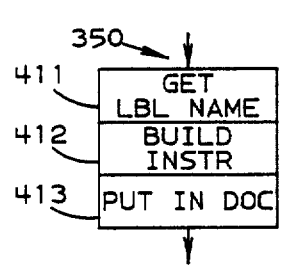

FIG. 4 details how help labels are inserted into the document.

Figure 5:
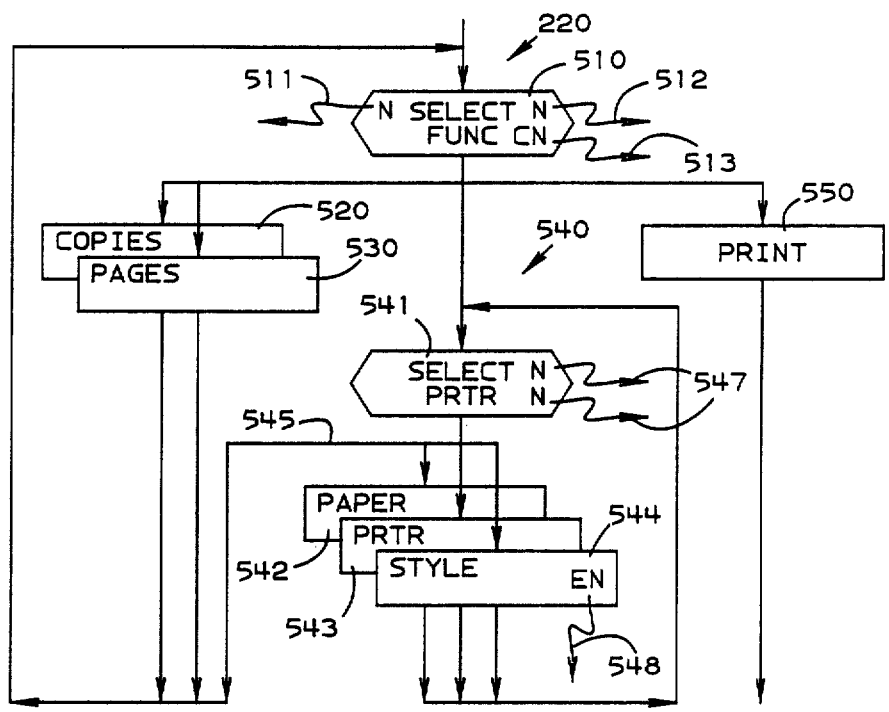

FIG. 5 is a partial flow chart showing how an application uses the document.

Figure 6:
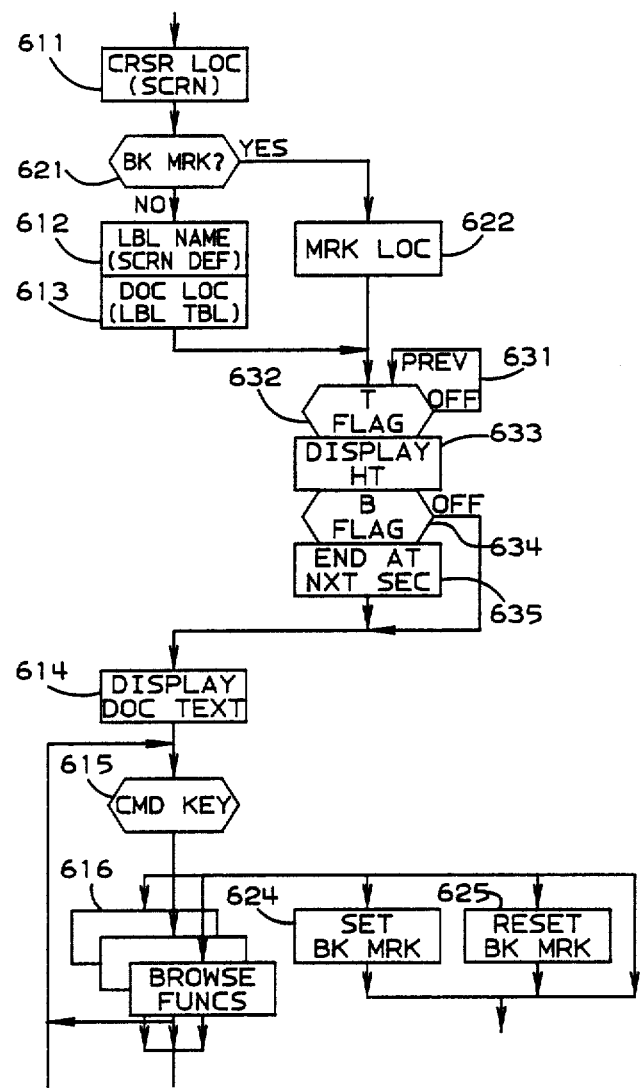

FIG. 6 shows how the application program vectors to the correct location in the document.

Figure 7:
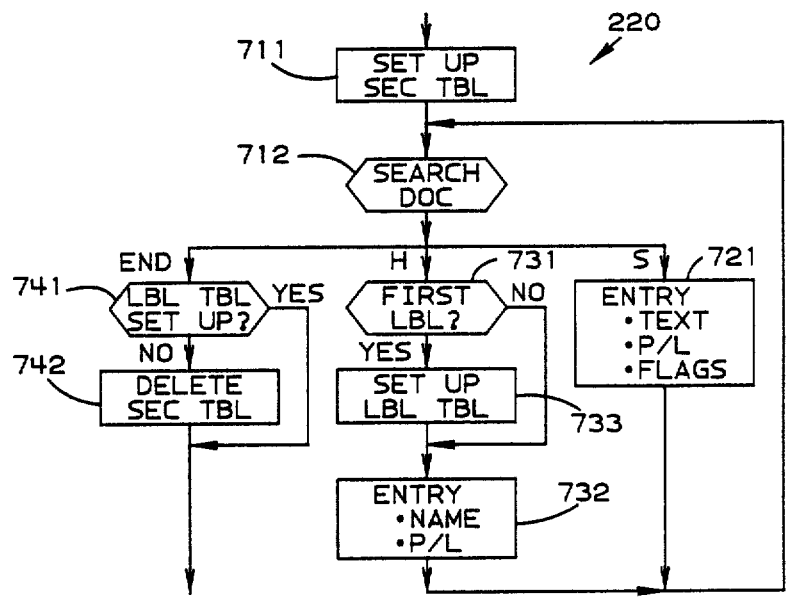

FIG. 7 shows how the word processor converts the on-line document for use by the application program.

Figure 8:
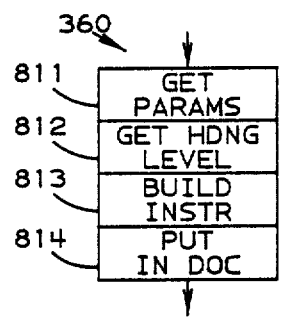

FIG. 8 details how section headings are inserted into the document.

DETAILED DESCRIPTION

In this embodiment, we shall use a slightly modified version of the publicly available IBM DisplayWrite/36 (DW/36) program, which executes on a conventional IBM System/36 data-processing system. The DW/36 program will be used in two ways: as a word processor which creates the on-line document, and as an application program which uses the document to provide on-line information.

Figure 1:
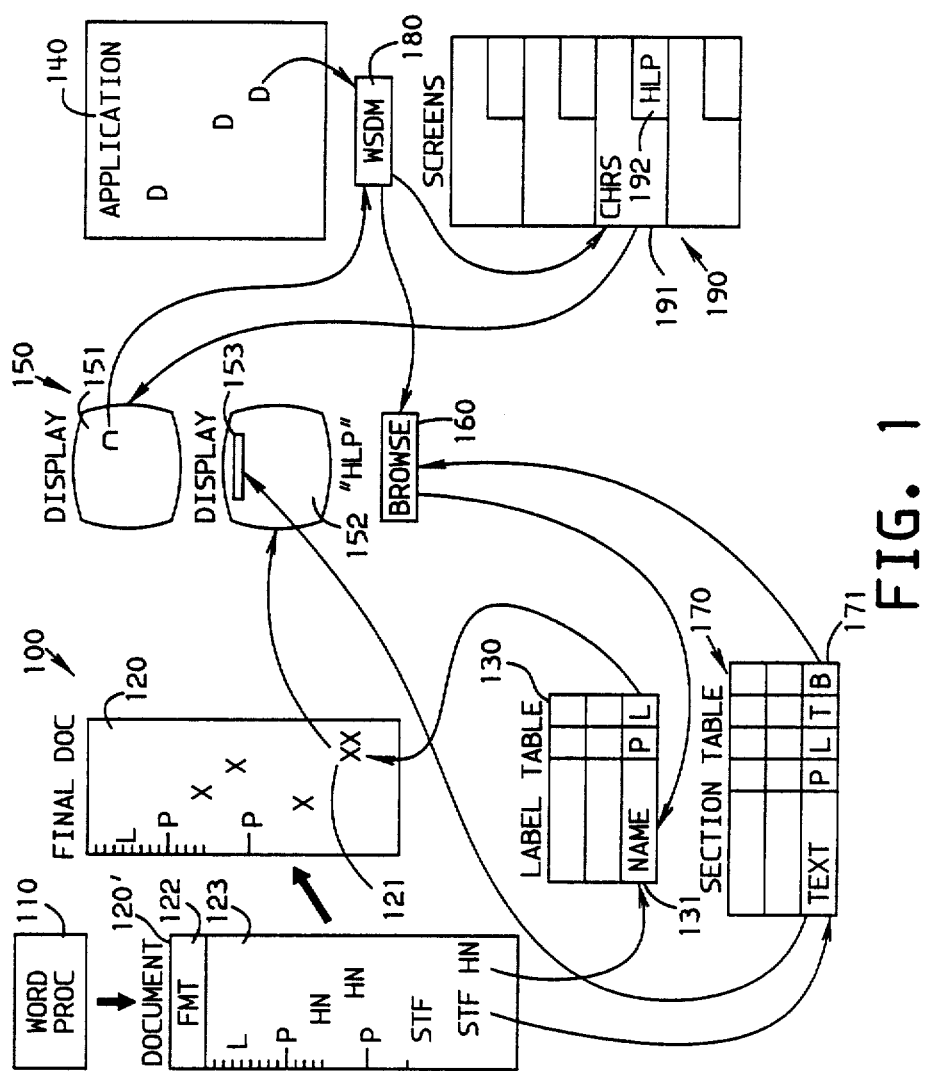
FIG. 1 is a symbolic representation of the data structures used by the invention.

FIG. 1 represents the entities 100—the data structures and programs—used in the present invention. Program 110 is a word processor (WP) for generating a document 120. In an initial version, document 120' is a revisable-form document 120', conventional except for labels HN and section headings STF positioned at various places in the text by WP 110. For DW/36, this file is conveniently a revisable-form document, having formatting information 122 and text 123, divided into pages P and lines L, as symbolized at the left-hand side. WP 110 later converts the initial document 120' into a final-form document 120 and builds a label table 130 and a section table 170. Label table 130 contains an entry 131 for each label, containing its (user-assigned) name, and its page/line location in document 120. Section table 170 has an entry 171 for the heading of each document section, as specified by the user. The entry holds the text of the heading and its page/line location in the document. (WP 110 removes the label and section data when converting document 120' into final form 120.)

Program 140 is the application program for which document 120 was written. Code at various points D in program 140 cause a workstation display manager (WSDM) system program 180 to call a specific screen 191 from a group 190 of screens associated with program 140, and to present it on screen 151 of display terminal 150. When the user presses the "Help" key, WSDM 180 gets the present location of the cursor C on screen 151, and consults data 192 stored with that screen to determine the name of the help-text label associated with that cursor location, and passes it to the browse program. Browse 160 finds the label name in table 130, and uses the page/line data of that entry 131 to find the help text 121 in document 120. (Help and section locations are denoted only by "X" in final document 120, since the actual codes and other data were removed as described above.) Also, a title line 153 contains the text from the nearest previous section heading whose T flag is on, in section-heading table 170; this is found by searching backward in section table 170 from the page/line locations in entry 131. (If no T flag is on, title line 153 is left blank.) Browse 160 uses the B flag to break a display screen at the end of the currently displayed section, rather than filling the remainder of the screen with material from the next section. Thus the first line of a section will always be on the first line of screen 152 when the B flag is on.

Document 120 may be a manual for the application program, comprising parts such as a table of contents, a guide or tutorial part, a more detailed reference section, a glossary, and an index. That is, document 120' substitutes for any or all of the usual printed manuals and documentation for the application; it can in fact be printed out to provide hard-copy documentation whenever desired.

But, in addition, labels 121 allow document 120 to be used on line, as a substitute for the normal on-line help text, as additional information for error messages, and in other ways. The operator can press a "Help" key to obtain context-sensitive explanations or aid for the function currently executing. The operator can browse the text, scroll forward and backward, go to a different page, look in the index for other references to the same subject, print out selected parts, and so forth. Moreover, he can book-mark his place in the document, go back to the application program for further work, then return to the help text exactly where he had left it. This is very important in performing long or complicated operations; they can be done one step at a time, returning after each step to the help text for instructions on the next step. The operator can also, of course, use the conventional system browse facility or WP 110 to read the document at any time, independently of any application program, and can print out all or part of it as hard copy.

Document 120 performs the duties of both conventional printed manuals and context-sensitive help text. But it provides other benefits as well. It eliminates the storage which would be required for two sets of information which are largely the same. It eliminates the possibility of inconsistencies between them. It is accessed and used the same way whether from within the application as help text or independently as a manual; the operator only needs to learn one procedure. In fact, unlike conventional on-line documentation, the operator need not leave the application program to use it. Since the document is produced on a word processor, the operator can modify it to add comments or examples, to highlight important text, etc. He then has a manual and help text which are personalizable to his own particular needs. Moreover, making the document an entity separate from the application program allows it to be translated into different languages without disturbing any of the code of that program. Also, of course, the document can be written, edited, and translated by personnel who need not be programmers or even have any knowledge of the internal structure of the application program.

Figure 2:
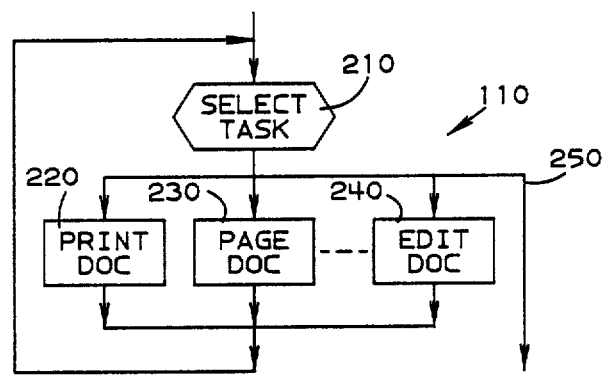
FIG. 2 is a high-level flowchart of a word processor for creating an on-line document.

FIG. 2 is a high-level flowchart of the DW/36 word processor program 110, FIG. 1. After the program is loaded, block 210 presents a menu allowing the operator to choose one of several broad tasks. Block 220 contains code for executing a conventional "Print Document" task. Block 230 contains code for a "Paginate Document" task. Block 240 has code for tasks involving the editing of a document, "Create Document" and "Revise Document"; these use almost entirely common code, and will be collectively termed the "Edit" task. Line 250 terminates the WP program when the operator selects that option from the menu.

Figure 3:
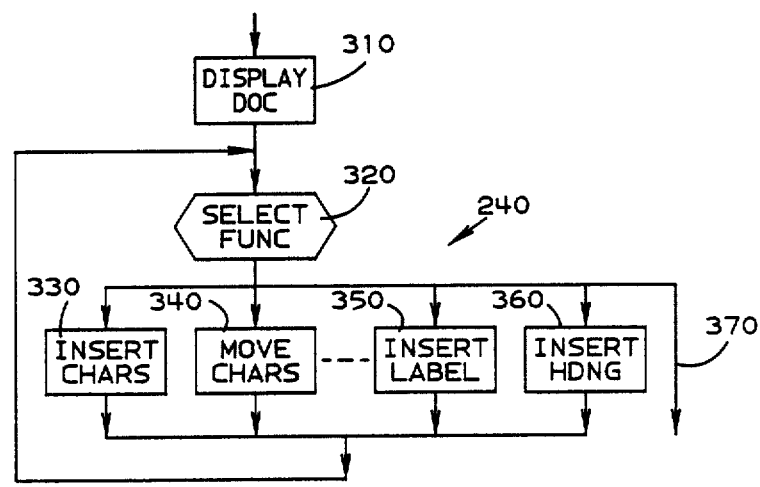
FIG. 3 shows where help-label insertion occurs during document creation.

FIG. 3 shows some of the functions of the "Edit" task 240, FIG. 2. After a menu (not shown) allowing format specifications and other preliminary matters, block 310 sets up the document text on the display screen. Block 320 then selects among the editing functions in response to operator keystrokes. Ordinary characters are merely inserted in the document text 123, FIG. 1, by block 330. Function keys invoke various conventional functions such as "Move Characters", block 340. The invention employs a new function called "Insert Help Text Label". It is invoked by choosing it from a menu displayed by pressing the "Instruction" keyboard key. Block 350 then executes a routine which generates the label. Another block, 360, also selectable from this menu, inserts a new section heading in the document. Finally, an editing session is ended at block 370 by pressing the "End Document" key.

FIG. 4 details the label-insertion routine 350, FIG. 3. When a label is to be inserted, block 411 issues a prompt to the screen requesting a name for the label. The operator types in a unique identifier, such as "PRNTSTYL", preferably relating to the subject matter discussed at that point in the document. Block 412 builds the label in the form of an instruction containing the necessary information; in this example, the instruction is ".± help PRNTSTYL" comprising a general instruction code, the type of instruction, and the name associated with this particular help label. Block 413 places the label instruction H in document 120', FIG. 1, at the cursor location on the display.

FIG. 8 details the section-heading insertion routine 360, FIG. 3. Although this routine is itself conventional, it is used in one aspect of the invention. (Heretofore, it was used only for building a table of contents for a document.) Block 811 requests the operator to specify the T and B flag parameters, discussed in FIG. 1. Block 812 asks for the level (h1, h2, etc.) of the heading; these are conventional. Block 813 builds an instruction of the form ".head h2 T B" and block 814 places it in document 120', as shown in FIG. 1.

FIG. 7 shows the portion of an otherwise conventional document-printing routine 220 which resolves the help-text labels for use by an application program. Block 711 first sets up the section-heading table 170, FIG. 1 on disk. Block 712 then searches document 120' for the relevant codes imbedded in the text. When a section-heading code S is encountered, block 721 makes an entry in the section table 170 for the text in the heading, and also places in it the page/line location of the section code in document 120, and the values of the T and B flags.

When a help-text label code H is found, block 731 causes block 732 to enter the label name and its page/line location into the label table 130, if that table already exists. If not, block 733 must first set up the table on disk. That is, table 130 is not actually created until the first label is inserted. Blocks 721 and 732 also remove the codes and information from the document text. When a document-end code is found, block 741 causes block 742 to delete section-heading table 170 if label table 130 had not been created, since it will not be needed in this case. Other conventional functions, not shown, in routine 220 convert document 120' to a DW/36 final-form document 120. Instead of sending the document to a printer, however, the writer would select a conventional option to save it in a disk file.

Document 120 can now be used on-line in several different ways. First, WP 110 can be used in a conventional manner to obtain and look at the document on the display, to move around within it by scrolling or by using a conventional search facility to find desired points, and to print out a hard copy if desired. A conventional system browse facility, such as the System/36 On-Line Browse utility can be used in much the same way to read all or part of the document on display 150, FIG. 1. The present invention also contemplates a novel third way, wherein an application program makes use of the help-text labels.

FIGS. 5 and 6 demonstrate the use of help-text labels by an application program. For economy of exposition, the following description uses the DW/36 word processor 110 itself as an application program 140. FIG. 5 illustrates the Print Document task 220 of FIG. 2, showing where the on-line help document is invoked. FIG. 6 shows how the appropriate text from the document is found and displayed.

When the operator selects the "Print Document" task 220 from menu 210 in FIG. 2, block 510 immediately presents a submenu requesting choices for certain parameters. Among the selectable functions are specifying the number of copies of an existing document to be printed at 520, specifying which document pages are to be printed at 530, and specifying printer parameters at 540. When all choices have been made, block 550 performs the actual printing task, then exits task 220. Function 540 itself has subfunctions selectable from menu 541; these include specifying the source of paper to be used for printing a document at 542, specifying which of multiple printers is to be used at 543, and choosing among possible type styles at 544.

At menu 510, the operator can move the cursor to any of a number of conventional predefined input fields at different screen locations, as symbolized at 511-513. Pressing the "Help" key then initiates the procedure detailed in FIG. 6, and performed partly by Browse 160 and partly by WSDM 180, FIG. 1.

In the WSDM program, block 611 first gets the current position C of the cursor on the screen (at 513 in this example). If no bookmark is in effect, block 612 looks up the label name N associated with this location in table 192 of the screen definition 191, FIG. 1, and passes it to Browse. Block 613 in Browse accesses label table 130 to find the document page and line numbers associated with this label name. Block 614 then displays on screen 152 the document text at that location. Block 615 responds to operator key presses to perform any of a number of conventional browsing functions 616 on the document, such as scrolling forward or backward, printing out a portion, and jumping to a particular page or section. Pressing the "End" key here ends the help text and returns to the application program.

Instead of ending the help function as above, the operator can press a "Bookmark" key to mark his current place and return to it later. Block 624 sets a Bookmark flag in WSDM and records the current document page/line location in the document, then exits Browse 160. The next time the help function is invoked from application program 140, block 621 finds the "Bookmark" flag on. Block 622 overrides the cursor position, and gets the document page/line location from WSDM. If the operator presses the "End" key when returning to the application, block 625 resets the bookmark flag. If instead he presses "Bookmark" again, the bookmark flag remains on, and the location of the mark is updated to the new current page/line location.

Block 632 determines whether the T flag is active for the section heading just prior to the page/line location of the help text; this is found by searching the entries in table 170. If the flag is off for that entry, line 631 tries the previous entry, until an active flag is found, as described previously. Block 633 then displays the heading text from the table entry 171. If block 634 finds that the B flag for the next entry 171 is off, block 614 fills up the entire display with help text. But, if the B flag is on, block 635 causes block 614 to end the display at the end of the current section, even if the screen is not full.

Help text can be activated from many different points in an application program. Continuing the example in FIG. 5, a submenu such as 541 will also have defined entry points 547 for help text. Selecting an inconsistent printstyle in subfunction 544, for example, presents an error message E on display 150. The operator could place the cursor on the error message and press "Help". A help-text label N in the error message would then vector to the appropriate document text as described above.

The operator then proceeds to select and modify a parameter in the Print task, such as the number of copies 520, the particular pages to print 530, or certain printer parameters 540. He may also merely press "Enter", which causes block 550 to begin printing at once.

The functions selected by block 510 can themselves have submenus, as shown at 540. Block 541 presents the printer parameters which can be selected at this point, and requests any new values the operator might wish to specify. These may include paper-handling options 542, draft/final mode printing 543, and type-style selection 544. Merely pressing "Enter" causes line 545 to exit function 540 and return to block 510. Menu 541—and many other blocks throughout the application program 140—have labels 547 (not shown) which work in the same way as labels 511–513. While selecting a type style at block 544, the operator might specify a style inconsistent with another parameter, such as selecting a particular 10-pitch font after having previously selected at 543 a printer which has only a 12-pitch spacing capability. Conventional practice in this situation would be to incorporate code in the application program 140 to display an error message also associated with the application program.

Modifications to the above embodiment will be obvious to those skilled in the art. Application program 140, for example, need not be a word processor program, and certainly not the same one which generates document 120. The relevant data and programs can be stored at any place in the data-processing system: partly in main storage, partly on disk, and in different places at different times. The label codes and information could be left in the document itself, rather than creating a separate label table, and similarly for the section table; that is, the term "document" can include items performing the functions of tables 130 and/or 170, as well as containing the help text. The separate display-manager utility 180 could be a part of the application program, as could the screens 190. Browse utility could be a part of the application, or even a part of word processor 110. The term "application" thus can be taken to include any or all of the items 140, 160, 180, and 190 which carry out the relevant interactions with the operator.

We claim as our invention:

1. A system for providing context-sensitive on-line documentation to an operator of a data processor having storage means, display means, and means for receiving inputs from said operator, comprising:

an application executed by said data processor for performing a number of different functions selected by an operator;

a unitary readable document stored in said data processor and containing text at predetermined locations relating to respective ones of said functions;

a set of screens stored in said data processor containing information relating to the selection of different ones of said functions and further containing data identifying a number of labels associated with various cursor positions in said screens;

a display manager executed by said data processor and responsive to said functions selected by said operator during execution of said application for selecting among said screens in said set, and responsive to operator-selected ones of said cursor positions for selecting certain of said labels;

a browse utility initiated by a command from said operator during the execution of said application to access said document, and then executed by said data processor in place of said application, and responsive to said display manager for presenting on said display means text at those predetermined locations in said document corresponding to said certain labels, said browse utility further including means for moving from said predetermined locations to arbitrary other locations in said document under operator control, and means responsive to yet a further command from said operator for terminating execution of said browse utility and returning to said application.

2. A system according to claim 1, further comprising a label table having entries associating each of said labels with at least one of said locations in said document, and wherein said browse utility includes means for translating said labels to corresponding ones of said document locations from said label table.

3. A system according to claim 2, wherein said label table contains a plurality of entries each containing a name of one of said labels and an indication of a corresponding one of said locations.

4. A system according to claim 3, wherein said document locations are specified by pages and lines, and wherein said indication specifies one of said pages and one of said lines.

5. A system according to claim 2, further comprising a section-heading table for relating said predetermined locations to section-heading text in said document, and wherein said browse utility includes means for presenting said section-heading text on said display.

* * * * *